United States Patent
Chen

(10) Patent No.: US 11,693,218 B2
(45) Date of Patent: Jul. 4, 2023

(54) CAMERA OPTICAL LENS

(71) Applicant: Changzhou Raytech Optronics Co., Ltd., Changzhou (CN)

(72) Inventor: Jiekang Chen, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 400 days.

(21) Appl. No.: 17/137,438

(22) Filed: Dec. 30, 2020

(65) Prior Publication Data

US 2022/0113507 A1 Apr. 14, 2022

(30) Foreign Application Priority Data

Oct. 13, 2020 (CN) .......................... 202011087337.2

(51) Int. Cl.
 *G02B 9/64* (2006.01)
 *G02B 13/00* (2006.01)
 *G02B 27/00* (2006.01)

(52) U.S. Cl.
 CPC .......... *G02B 13/0045* (2013.01); *G02B 9/64* (2013.01); *G02B 27/0025* (2013.01)

(58) Field of Classification Search
 CPC ... G02B 9/64; G02B 13/0045; G02B 27/0025
 See application file for complete search history.

(56) References Cited

FOREIGN PATENT DOCUMENTS

CN        111290104 A1       6/2020

OTHER PUBLICATIONS

PCT search report dated Jul. 2, 2021 by SIPO in related PCT Patent Application No. PCT/CN2020/125714 (5 Pages).

*Primary Examiner* — Jack Dinh
(74) *Attorney, Agent, or Firm* — W&G Law Group

(57) ABSTRACT

The present disclosure relates to optical lens, and provides a camera optical lens including eight lenses, from an object side to an image side in sequence: a first lens having a positive refractive power, a second lens having a negative refractive power, a third lens having a negative refractive power, a fourth lens having a negative refractive power, a fifth lens having a negative refractive power, a sixth lens having a positive refractive power, a seventh lens, and an eighth lens having a negative refractive power; wherein the camera optical lens satisfies the following conditions: $0.95 \le f/TTL$; $-4.00 \le f2/f \le -1.80$; and $-20.00 \le (R15+R16)/(R15-R16) \le -3.00$. The camera optical lens can achieve good optical performance while meeting design requirements for a long focal length and ultra-thinness.

11 Claims, 9 Drawing Sheets

CAMERA OPTICAL LENS

TECHNICAL FIELD

The present disclosure relates to optical lens, particularly, to a camera optical lens suitable for handheld devices, such as smart phones and digital cameras, and imaging devices, such as monitors and PC lenses.

BACKGROUND

With an emergence of smart phones in recent years, a demand for miniature camera lens is increasing day by day. However, in general, photosensitive devices of camera lens are nothing more than Charge Coupled Device (CCD) or Complementary Metal-Oxide Semiconductor Sensor (CMOS sensor). As a progress of semiconductor manufacturing technology makes a pixel size of the photosensitive devices become smaller, in addition to a current development trend of electronic products towards better functions and thinner and smaller dimensions, miniature camera lenses with good imaging quality therefore have become a mainstream in the market.

In order to obtain better imaging quality, the lens that is traditionally equipped in mobile phone cameras adopts a three-piece, four-piece, or even five-piece or six-piece lens structure. However, with a development of technology and an increase of diverse demands of users, as a pixel area of the photosensitive devices is becoming smaller and smaller and a requirement of the system on the imaging quality is improving constantly, an eight-piece lens structure gradually appears in lens designs. Although a typical eight-piece lens already has a good optical performance, its refractive power, lens spacing and lens shape remain unreasonable to some extent, resulting in that the lens structure, which, even though, has excellent optical performance, is not able to meet the design requirement for a long focal length and ultra-thinness.

SUMMARY

Some embodiments of the present disclosure provide a camera optical lens. The camera optical lens includes eight lenses, from an object side to an image side in sequence: a first lens having a positive refractive power, a second lens having a negative refractive power, a third lens having a negative refractive power, a fourth lens having a negative refractive power, a fifth lens having a negative refractive power, a sixth lens having a positive refractive power, a seventh lens, and an eighth lens having a negative refractive power. The camera optical lens satisfies the following conditions: $0.95 \leq f/TTL$; $-4.00 \leq f2/f \leq -1.80$; and $-20.00 \leq (R15+R16)/(R15-R16) \leq -3.00$, where TTL denotes a total optical length from an object-side surface of the first lens to an image surface of the camera optical lens along an optical axis; f denotes a focal length of the camera optical lens; f2 denotes a focal length of the second lens; R15 denotes a central curvature radius of an object-side surface of the eighth lens; R16 denotes a central curvature radius of an image-side surface of the eighth lens.

As an improvement, the camera optical lens satisfies the following condition: $0.90 \leq f6/f \leq 2.50$, where f6 denotes a focal length of the sixth lens.

As an improvement, the camera optical lens satisfies the following conditions: $0.23 \leq f1/f \leq 0.72$; $-1.61 \leq (R1+R2)/(R1-R2) \leq -0.47$; and $0.05 \leq d1/TTL \leq 0.20$, where f1 denotes a focal length of the first lens; R1 denotes a central curvature radius of an object-side surface of the first lens; R2 denotes a central curvature radius of an image-side surface of the first lens; and d1 denotes an on-axis thickness of the first lens.

As an improvement, the camera optical lens satisfies the following conditions: $-2.33 \leq (R3+R4)/(R3-R4) \leq -0.30$; and $0.02 \leq d3/TTL \leq 0.06$, where R3 denotes a central curvature radius of an object-side surface of the second lens; R4 denotes a central curvature radius of an image-side surface of the second lens; and d3 denotes an on-axis thickness of the second lens.

As an improvement, the camera optical lens satisfies the following conditions: $-4.05 \leq f3/f \leq -1.07$; $0.67 \leq (R5+R6)/(R5-R6) \leq 4.48$; and $0.02 \leq d5/TTL \leq 0.06$, where f3 denotes a focal length of the third lens; R5 denotes a central curvature radius of an object-side surface of the third lens; R6 denotes a central curvature radius of an image-side surface of the third lens; and d5 denotes an on-axis thickness of the third lens.

As an improvement, the camera optical lens satisfies the following conditions: $-4.46 \leq f4/f \leq -0.99$; $1.68 \leq (R7+R8)/(R7-R8) \leq 8.60$; and $0.02 \leq d7/TTL \leq 0.06$; where f4 denotes a focal length of the fourth lens; R7 denotes a central curvature radius of an object-side surface of the fourth lens; R8 denotes a central curvature radius of an image-side surface of the fourth lens; and d7 denotes an on-axis thickness of the fourth lens.

As an improvement, the camera optical lens satisfies the following conditions: $-5.33 \leq f5/f \leq -1.45$; $-9.27 \leq (R9+R10)/(R9-R10) \leq -2.42$; and $0.02 \leq d9/TTL \leq 0.06$; where f5 denotes a focal length of the fifth lens; R9 denotes a central curvature radius of an object-side surface of the fifth lens; R10 denotes a central curvature radius of an image-side surface of the fifth lens; and d9 denotes an on-axis thickness of the fifth lens.

As an improvement, the camera optical lens satisfies the following conditions: $-14.57 \leq (R11+R12)/(R11-R12) \leq -0.78$; and $0.02 \leq d11/TTL \leq 0.13$; where R11 denotes a central curvature radius of an object-side surface of the sixth lens; R12 denotes a central curvature radius of an image-side surface of the sixth lens; and d11 denotes an on-axis thickness of the sixth lens.

As an improvement, the camera optical lens satisfies the following conditions: $-2.37 \leq f7/f \leq 127.2$; $-133.01 \leq (R13+R14)/(R13-R14) \leq -0.37$; and $0.04 \leq d13/TTL \leq 0.20$; where f7 denotes a focal length of the seventh lens; R13 denotes a central curvature radius of an object-side surface of the seventh lens; R14 denotes a central curvature radius of an image-side surface of the seventh lens; and d13 denotes an on-axis thickness of the seventh lens.

As an improvement, the camera optical lens satisfies the following conditions: $-56.04 \leq f8/f \leq -1.17$; and $0.03 \leq d15/TTL \leq 0.13$; where f8 denotes a focal length of the eighth lens; and d15 denotes an on-axis thickness of the eighth lens.

As an improvement, the camera optical lens satisfies the following conditions: $f/IH \geq 2.00$, where IH denotes an image height of the camera optical lens.

The present disclosure has advantages in: the camera optical lens in the present disclosure has good optical performance and has characteristics of a large aperture, a long focal length and ultra-thinness, and is especially applicable to mobile phone camera lens assemblies and WEB camera lenses composed by such camera elements as CCD and CMOS for high pixels.

BRIEF DESCRIPTION OF DRAWINGS

To illustrate technical solutions according to embodiments of the present disclosure more clearly, accompanying drawings for describing the embodiments are introduced briefly in the following. Apparently, accompanying drawings in the following description are only some embodiments of the present disclosure, and persons of ordinary skill in the art can derive other drawings from the accompanying drawings without creative efforts.

DETAILED DESCRIPTION OF EMBODIMENTS

To make objectives, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
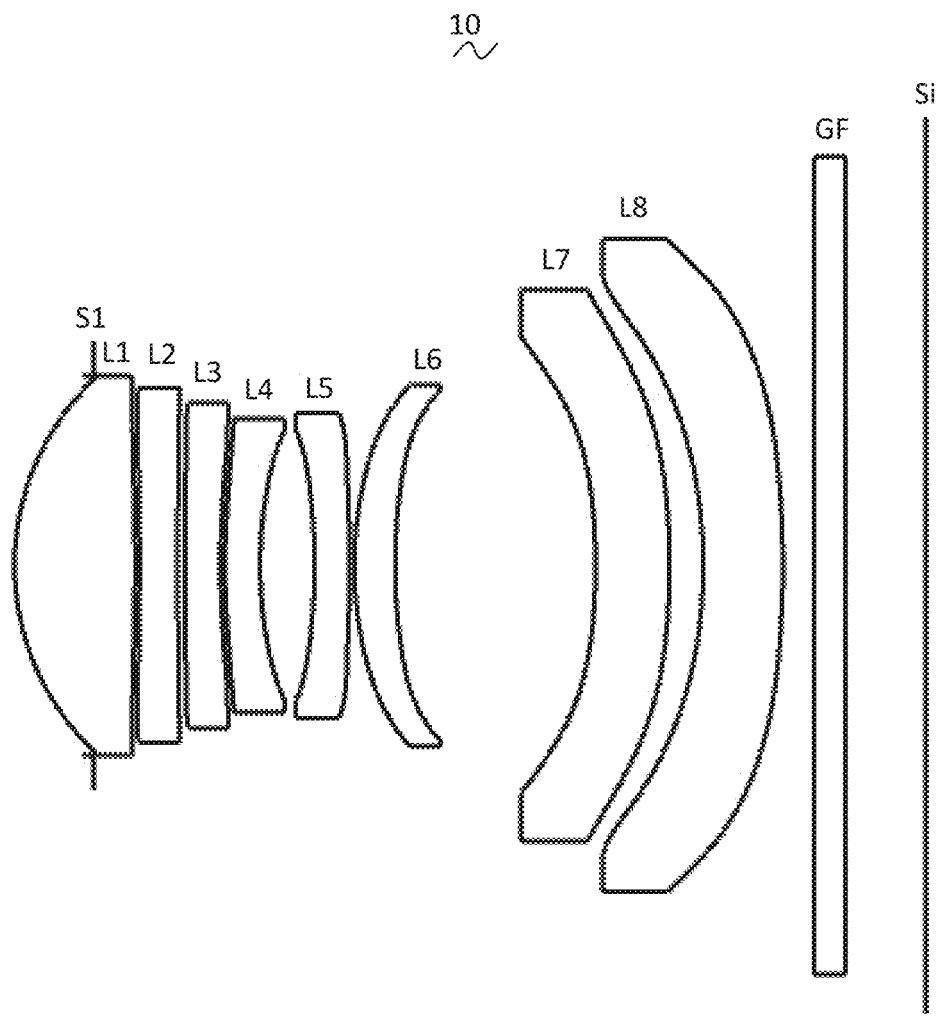
FIG. 1 is a schematic diagram of a structure of a camera optical lens according to Embodiment 1 of the present disclosure.

Referring to the accompanying drawing, the present disclosure provides a camera optical lens 10. FIG. 1 shows a schematic diagram of a structure of a camera optical lens 10 of Embodiment 1 of the present disclosure, and the camera optical lens 10 includes eight lenses. Specifically, the camera optical lens 10 includes, from an object side to an image side in sequence: an aperture S1, a first lens L1, a second lens L2, a third lens L3, a fourth lens L4, a fifth lens L5, a sixth lens L6, a seventh lens L7 and an eighth lens L8. An optical element such as an optical filter GF can be arranged between the eighth lens L8 and an image surface Si.

In this embodiment, the first lens L1 has a positive refractive power, the second lens L2 has a negative refractive power, the third lens L3 has a negative refractive power, the fourth lens L4 has a negative refractive power, the fifth lens L5 has a negative refractive power, the sixth lens L6 has a positive refractive power, the seventh lens L7 has a positive power and the eighth lens L8 has a negative refractive power. It should be appreciated that, in other embodiments, the second lens L2, the third lens L3, the fourth lens L4, the fifth lens L5, the sixth lens L6, the seventh lens L7 and the eighth lens L8 may have other refractive powers than that of this embodiment. In this embodiment, the first lens L1 has a positive refractive power, which facilitates improving performance of the camera optical lens 10.

In this embodiment, the first lens L1, the second lens L2, the third lens L3, the fourth lens L4, the fifth lens L5, the sixth lens L6, the seventh lens L7 and the eighth lens L8 are made of plastic material. In other embodiments, the lenses may be made of other materials.

In this embodiment, a total optical length from the object side surface of the first lens L1 to an image surface Si of the camera optical lens 10 along an optical axis is defined as TTL, a focal length of the camera optical lens 10 is defined as f, a focal length of the second lens L2 is defined as f2, a central curvature radius of an object-side surface of the eighth lens L8 is defined as R15, and a central curvature radius of an image-side surface of the eighth lens L8 is defined as R16. The camera optical lens 10 satisfies the following condition: $0.95 \leq f/TTL$ (1); $-4.00 \leq f2/f \leq -1.80$ (2); and $-20.00 \leq (R15+R16)/(R15-R16) \leq -3.00$ (3).

The condition (1) specifies a ratio of the focal length of the camera optical lens 10 to the total optical length of the camera optical lens 10. When the condition (1) is satisfied, given the same total optical length TTL, the camera optical lens 10 has a longer focal length. Preferably, the camera optical lens 10 satisfies the following condition: $0.99 \leq f/TTL$.

The condition (2) specifies a ratio of the focal length f2 of the second lens L2 to the focal length f of the camera optical lens 10, which can effectively balance a spherical aberration and a field curvature of the camera optical lens 10.

The condition (3) specifies a shape of the eighth lens L8. Within this condition (3), a deflection degree of the light passing through the lens can be alleviated, and an aberration can be effectively reduced.

A focal length of the sixth lens L6 is defined as f6. The camera optical lens 10 satisfies the following condition: $0.90 \leq f6/f \leq 2.50$, which specifies a ratio of a focal length f6 of the sixth lens L6 to a focal length f of the camera optical lens. With a reasonable distribution of the refractive power, the camera optical lens 10 has better imaging quality and lower sensitivity. Preferably, the camera optical lens 10 satisfies the following condition: $0.92 \leq f5/f \leq 2.21$.

In this embodiment, the first lens L1 includes an object-side surface being convex in a paraxial region and an image-side surface being convex in the paraxial region.

The focal length of the camera optical lens 10 is defined as f, and a focal length of the first lens is defined as f1. The camera optical lens 10 satisfies the following condition: $0.23 \leq f1/f \leq 0.72$, which specifies a ratio of the focal length of the first lens L1 to the focal length of the camera optical lens 10. Within this condition, the first lens L1 has an appropriate positive refractive power, the correction of the aberration of the camera optical lens 10 is facilitated, and the development of the lenses towards ultra-thinness is facilitated. Preferably, the camera optical lens 10 satisfies the following condition: $0.36 \leq f1/f \leq 0.57$.

A central curvature radius of an object-side surface of the first lens L1 is defined as R1, and a central curvature radius of an image-side surface of the first lens L1 is defined as R2. The camera optical lens 10 satisfies the following condition: $-1.61 \leq (R1+R2)/(R1-R2) \leq -0.47$. This can reasonably control a shape of the first lens L1 in such a manner that the first lens L1 can effectively correct a spherical aberration of the camera optical lens. Preferably, the camera optical lens 10 satisfies the following condition: $-1.01 \leq (R1+R2)/(R1-R2) \leq -0.59$.

An on-axis thickness of the first lens L1 is defined as d1, and the total optical length of the camera optical lens 10 is defined as TTL. The camera optical lens 10 satisfies the following condition: $0.05 \leq d1/TTL \leq 0.20$. Within this condition, ultra-thinness can be realized. Preferably, the camera optical lens 10 satisfies the following condition: $0.09 \leq d1/TTL \leq 0.16$.

In this embodiment, the second lens L2 includes an object-side surface being concave in a paraxial region and an image-side surface being convex in the paraxial region.

A central curvature radius of the object-side surface of the second lens L2 is defined as R3, and a central curvature radius of the image-side surface of the second lens L2 is defined as R4. The camera optical lens 10 satisfies the following condition: $-2.33 \leq (R3+R4)/(R3-R4) \leq -0.30$, which specifies a shape of the second lens L2. Within this condition, the development of the lenses towards ultra-thinness would facilitate correcting the on-axis chromatic aberration. Preferably, the camera optical lens 10 satisfies the following condition: $-1.46 \leq (R3+R4)/(R3-R4) \leq -0.37$.

An on-axis thickness of the second lens L2 is defines as d3, and the total optical length of the camera optical lens 10 is defined as TTL. The camera optical lens 10 satisfies the following condition: $0.02 \leq d3/TTL \leq 0.06$. Within this condition, ultra-thinness of the lenses can be realized. Preferably, the camera optical lens 10 satisfies the following condition: $0.03 \leq d3/TTL \leq 0.05$.

In this embodiment, the third lens L3 includes an object-side surface being convex in a paraxial region and an image-side surface being concave in the paraxial region.

The focal length of the camera optical lens 10 is defined as f, and a focal length of the third lens L3 is defined as f3. The camera optical lens 10 satisfies the following condition: $-4.05 \leq f3/f \leq -1.07$. With a reasonable distribution of the refractive power, the camera optical lens 10 has better imaging quality and lower sensitivity. Preferably, the camera optical lens 10 satisfies the following condition: $-2.53 \leq f3/f \leq -1.34$.

A central curvature radius of an object-side surface of the third lens is defined as R5; a central curvature radius of an image-side surface of the third lens is defined as R6. The camera optical lens 10 satisfies the following condition: $0.67 \leq (R5+R6)/(R5-R6) \leq 4.48$, which can effectively control a shape of the third lens L3 and is better for the shaping of the third lens L3. Within this condition, a deflection degree of the light passing through the lens can be alleviated, and an aberration can be effectively reduced. Preferably, the camera optical lens 10 satisfies the following condition: $1.07 \leq (R5+R6)/(R5-R6) \leq 3.58$.

An on-axis thickness of the third lens L3 is defined as d5 the total optical length of the camera optical lens 10 is defined as TTL. The camera optical lens 10 satisfies the following condition: $0.02 \leq d5/TTL \leq 0.06$. Within this condition, ultra-thinness of the lenses can be realized. Preferably, the camera optical lens 10 satisfies the following condition: $0.03 \leq d5/TTL \leq 0.05$.

In this embodiment, the fourth lens L4 includes an object-side surface being convex in a paraxial region and an image-side surface being concave in the paraxial region.

A focal length of the camera optical lens 10 is defined as f, a focal length of the fourth lens is defined as f4. The camera optical lens 10 satisfies the following condition: $-4.46 \leq f4/f \leq -0.99$. With a reasonable distribution of the refractive power, the camera optical lens 10 has better imaging quality and lower sensitivity. Preferably, the camera optical lens 10 satisfies the following condition: $-2.79 \leq f4/f \leq -1.23$.

A central curvature radius of the object-side surface of the fourth lens L4 is defined as R7, and a central curvature radius of the image-side surface of the fourth lens L4 is defined as R8. The camera optical lens 10 satisfies the following condition: $1.68 \leq (R7+R8)/(R7-R8) \leq 8.60$, which specifies a shape of the fourth lens L4. Within this condition, the development of the lenses towards ultra-thinness would facilitate correcting the off-axis aberration. Preferably, the camera optical lens 10 satisfies the following condition: $2.68 \leq (R7+R8)/(R7-R8) \leq 6.88$.

An on-axis thickness of the fourth lens L4 is defined as d7, and the total optical length of the camera optical lens 10 is defined as TTL. The camera optical lens 10 satisfies the following condition: $0.02 \leq d7/TTL \leq 0.06$. Within this condition, ultra-thinness of the lenses can be realized. Preferably, the camera optical lens 10 satisfies the following condition: $0.03 \leq d7/TTL \leq 0.05$.

In this embodiment, the fifth lens L5 includes an object-side surface being concave in a paraxial region and an image-side surface being convex in the paraxial region.

The focal length of the camera optical lens 10 is defined as f, and a focal length of the fifth lens L5 is defined as f5. The camera optical lens 10 satisfies the following condition: $-5.33 \leq f5/f \leq -1.45$. With a reasonable distribution of the focal power, the camera optical lens 10 has better imaging quality and lower sensitivity. Preferably, the camera optical lens 10 satisfies the following condition: $-3.33 \leq f6/f \leq -1.81$.

A central curvature radius of an object-side surface of the fifth lens L5 is defined as R9, and a central curvature radius of an image-side surface of the fifth lens L5 is defined as R10. The camera optical lens 10 satisfies the following condition: $-9.27 \leq (R9+R10)/(R9-R10) \leq -2.42$, which specifies a shape of the sixth lens L5. Within this condition, the development of the lenses towards ultra-thinness would facilitate correcting the off-axis aberration. Preferably, the camera optical lens 10 satisfies the following condition: $-5.79 \leq (R9+R10)/(R9-R10) \leq -3.03$.

An on-axis thickness of the fifth lens L5 is defined as d9, and the total optical length of the camera optical lens 10 is defined as TTL. The camera optical lens 10 satisfies the following condition: $0.02 \leq d9/TTL \leq 0.06$. Within this condition, ultra-thinness of the lenses can be realized. Preferably, the camera optical lens 10 satisfies the following condition: $0.03 \leq d9/TTL \leq 0.05$.

In this embodiment, the sixth lens L6 includes an object-side surface being convex in a paraxial region and an image-side surface being concave in the paraxial region.

A central curvature radius of the object-side surface of the sixth lens L6 is defined as R11, and a central curvature radius of the image-side surface of the sixth lens L6 is defined as R12. The camera optical lens 10 satisfies the following condition: $-14.57 \leq (R11+R12)/(R11-R12) \leq -0.78$, which specifies a shape of the sixth lens L6. Within this condition, the development of the lenses towards ultra-thinness would facilitate correcting the off-axis aberration. Preferably, the camera optical lens 10 satisfies the following condition: $-9.11 \leq (R11+R12)/(R11-R12) \leq -0.97$.

An on-axis thickness of the sixth lens L6 is defined as d11, and the total optical length of the camera optical lens 10 is defined as TTL. The camera optical lens 10 satisfies the following condition: $0.02 \leq d11/TTL \leq 0.13$. Within this condition, ultra-thinness of the lenses can be realized. Preferably, the camera optical lens 10 satisfies the following condition: 0.04≤d11/TTL≤0.10.

In this embodiment, the seventh lens L7 includes an object-side surface being concave in a paraxial region and an image-side surface being convex in the paraxial region.

The focal length of the camera optical lens 10 is defined as f, and a focal length of the seventh lens L7 is defined as f7. The camera optical lens 10 satisfies the following condition: −2.37≤f7/f≤127.2. With a reasonable distribution of the focal power, the system has better imaging quality and lower sensitivity. Preferably, the camera optical lens 10 satisfies the following condition: −1.48≤f7/f≤101.76.

A central curvature radius of the object-side surface of the seventh lens L7 is defined as R13, and a central curvature radius of the image-side surface of the seventh lens L7 is defined as R14. The camera optical lens 10 satisfies the following condition: −133.01≤(R13+R14)/(R13−R14)≤−0.37, which specifies a shape of the seventh lens L7. Within this condition, the development of the lenses towards ultra-thinness would facilitate correcting the off-axis aberration. Preferably, the camera optical lens 10 satisfies the following condition: −83.13≤(R13+R14)/(R13−R14)≤−0.47.

An on-axis thickness of the seventh lens L7 is defined as d13, and the total optical length of the camera optical lens 10 is defined as TTL. The camera optical lens 10 satisfies the following condition: 0.04≤d13/TTL≤0.20. Within this condition, ultra-thinness of the lenses is facilitated. Preferably, the camera optical lens 10 satisfies the following condition: 0.07≤d13/TTL≤0.16.

In this embodiment, the eighth lens L8 includes an object-side surface being concave in a paraxial region and an image-side surface being convex in the paraxial region.

The focal length of the camera optical lens 10 is defined as f, and a focal length of the eighth lens L8 is defined as f8. The camera optical lens 10 satisfies the following condition: −56.04≤f8/f≤−1.17. With a reasonable distribution of the focal power, the system has better imaging quality and lower sensitivity. Preferably, the camera optical lens 10 satisfies the following condition: −35.03≤f8/f≤−1.47.

An on-axis thickness of the eighth lens L8 is defined as d15 and the total optical length of the camera optical lens 10 is defined as TTL. The camera optical lens 10 satisfies the following condition: 0.03≤d15/TTL≤0.13. Within this condition, ultra-thinness of the lenses can be realized. Preferably, the camera optical lens 10 satisfies the following condition: 0.05≤d15/TTL≤0.11.

In this embodiment, an image height of the camera optical lens 10 is defined as IH, and the focal length of the camera optical lens 10 is defined as f. The camera optical lens 10 satisfies the following condition: f/IH≥2.00, which facilitates achieving a long focal length of the camera optical lens 10.

In this embodiment, the image height of the camera optical lens 10 is defined as IH, and the total optical length of the camera optical lens 10 is defined as TTL. The camera optical lens 10 satisfies the following condition: TTL/IH≤2.05, which facilitates ultra-thinness of the camera optical lens 10.

It should be appreciated that, in other embodiments, configuration of the object-side surfaces and the image-side surfaces of the first lens L1, the second lens L2, the third lens L3, the fourth lens L4, the fifth lens L5, the sixth lens L6, the seventh lens L7 and the eighth lens L8 may have a distribution in convex and concave other than that of the above-discussed embodiment.

When the above relationships are satisfied, the camera optical lens 10 meets the design requirements of a long focal length and ultra-thinness while having excellent optical imaging performance. Based on the characteristics of the camera optical lens 10, the camera optical lens 10 is particularly applicable to mobile camera lens assemblies and WEB camera lenses composed of such camera elements as CCD and CMOS for high pixels.

The camera optical lens 10 will be further described with reference to the following examples. Symbols used in various examples are shown as follows. The focal length, on-axis distance, central curvature radius, on-axis thickness, inflexion point position, and arrest point position are all in units of mm.

TTL: Total optical length (the distance from the object side surface of the first lens L1 to the image surface Si of the camera optical lens along the optical axis) in mm.

FNO: ratio of an effective focal length and an entrance pupil diameter of the camera optical lens.

Preferably, inflexion points and/or arrest points can be arranged on the object-side surface and/or the image-side surface of each lens, so as to satisfy the demand for high quality imaging. The description below can be referred for specific implementations.

The design data of the camera optical lens 10 in Embodiment 1 of the present disclosure are shown in Table 1 and Table 2.

TABLE 1

|  | R | d | nd |  | vd |  |
|---|---|---|---|---|---|---|
| S1 | ∞ | d0= | −0.518 |  |  |  |
| R1 | 1.679 | d1= | 0.789 | nd1 | 1.5444 v1 | 55.82 |
| R2 | −15.511 | d2= | 0.030 |  |  |  |
| R3 | −15.233 | d3= | 0.250 | nd2 | 1.6700 v2 | 19.39 |
| R4 | −198.870 | d4= | 0.050 |  |  |  |
| R5 | 36.839 | d5= | 0.230 | nd3 | 1.6153 v3 | 25.94 |
| R6 | 5.257 | d6= | 0.030 |  |  |  |
| R7 | 5.040 | d7= | 0.230 | nd4 | 1.6700 v4 | 19.39 |
| R8 | 2.725 | d8= | 0.357 |  |  |  |
| R9 | −3.038 | d9= | 0.230 | nd5 | 1.5444 v5 | 55.82 |
| R10 | −4.710 | d10= | 0.030 |  |  |  |
| R11 | 2.326 | d11= | 0.266 | nd6 | 1.6700 v6 | 19.39 |
| R12 | 3.066 | d12= | 1.314 |  |  |  |
| R13 | −4.487 | d13= | 0.485 | nd7 | 1.6700 v7 | 19.39 |
| R14 | −4.624 | d14= | 0.222 |  |  |  |
| R15 | −2.727 | d15= | 0.521 | nd8 | 1.5444 v8 | 55.82 |
| R16 | −5.388 | d16= | 0.200 |  |  |  |
| R17 | ∞ | d17= | 0.210 | ndg | 1.5168 vg | 64.17 |
| R18 | ∞ | d18= | 0.524 |  |  |  |

In the table, meanings of various symbols will be described as follows.

S1: aperture;

R: central curvature radius of an optical surface;

R1: central curvature radius of the object-side surface of the first lens L1;

R2: central curvature radius of the image-side surface of the first lens L1;

R3: central curvature radius of the object-side surface of the second lens L2;

R4: central curvature radius of the image-side surface of the second lens L2;

R5: central curvature radius of the object-side surface of the third lens L3;

R6: central curvature radius of the image-side surface of the third lens L3;

R7: central curvature radius of the object-side surface of the fourth lens L4;

R8: central curvature radius of the image-side surface of the fourth lens L4;

R9: central curvature radius of the object-side surface of the fifth lens L5;

R10: central curvature radius of the image-side surface of the fifth lens L5;

R11: central curvature radius of the object-side surface of the sixth lens L6;

R12: central curvature radius of the image-side surface of the sixth lens L6;

R13: central curvature radius of the object-side surface of the seventh lens L7;

R14: central curvature radius of the image-side surface of the seventh lens L7;

R15: central curvature radius of the object-side surface of the eighth lens L8;

R16: central curvature radius of the image-side surface of the eighth lens L8;

R17: central curvature radius of an object-side surface of the optical filter GF;

R18: central curvature radius of an image-side surface of the optical filter GF;

d: on-axis thickness of a lens and an on-axis distance between lenses;

d0: on-axis distance from the aperture S1 to the object-side surface of the first lens L1;

d1: on-axis thickness of the first lens L1;

d2: on-axis distance from the image-side surface of the first lens L1 to the object-side surface of the second lens L2;

d3: on-axis thickness of the second lens L2;

d4: on-axis distance from the image-side surface of the second lens L2 to the object-side surface of the third lens L3;

d5: on-axis thickness of the third lens L3;

d6: on-axis distance from the image-side surface of the third lens L3 to the object-side surface of the fourth lens L4;

d7: on-axis thickness of the fourth lens L4;

d8: on-axis distance from the image-side surface of the fourth lens L4 to the object-side surface of the fifth lens L5;

d9: on-axis thickness of the fifth lens L5;

d10: on-axis distance from the image-side surface of the fifth lens L5 to the object-side surface of the sixth lens L6F;

d11: on-axis thickness of the sixth lens L6;

d12: on-axis distance from the image-side surface of the sixth lens L6 to the object-side surface of the seventh lens L7;

d13: on-axis thickness of the seventh lens L7;

d14: on-axis distance from the image-side surface of the seventh lens L7 to the object-side surface of the eighth lens L8;

d15: on-axis thickness of the eighth lens L8;

d16: on-axis distance from the image-side surface of the eighth lens L8 to the object-side surface of the optical filter GF;

d17: on-axis thickness of the optical filter GF;

d18: on-axis distance from the image-side surface of the optical filter GF to the image surface Si;

nd: refractive index of the d line;

nd1: refractive index of the d line of the first lens L1;

nd2: refractive index of the d line of the second lens L2;

nd3: refractive index of the d line of the third lens L3;

nd4: refractive index of the d line of the fourth lens L4;

nd5: refractive index of the d line of the fifth lens L5;

nd6: refractive index of the d line of the sixth lens L6;

nd7: refractive index of the d line of the seventh lens L7;

nd8: refractive index of the d line of the eighth lens L8;

ndg: refractive index of the d line of the optical filter GF;

vd: abbe number;

v1: abbe number of the first lens L1;

v2: abbe number of the second lens L2;

v3: abbe number of the third lens L3;

v4: abbe number of the fourth lens L4;

v5: abbe number of the fifth lens L5;

v6: abbe number of the sixth lens L6;

v7: abbe number of the seventh lens L7;

v8: abbe number of the eighth lens L8;

vg: abbe number of the optical filter GF.

Table 2 shows aspheric surface data of the camera optical lens 10 in Embodiment 1 of the present disclosure.

TABLE 2

| | Conic coefficient | Aspheric surface coefficients | | | | |
|---|---|---|---|---|---|---|
| | k | A4 | A6 | A8 | A10 | A12 |
| R1 | −6.2931E−02 | 4.7647E−04 | −4.6966E−04 | 6.2637E−03 | −9.4852E−03 | 4.7387E−03 |
| R2 | 6.8435E+01 | 2.9199E−02 | −1.1775E−01 | 3.9445E−01 | −6.4047E−01 | 5.5521E−01 |
| R3 | −8.9662E+01 | 7.1875E−02 | −2.6819E−01 | 6.5273E−01 | −9.2178E−01 | 7.0106E−01 |
| R4 | −2.0000E+02 | 1.2724E−01 | −6.3881E−01 | 1.6199E+00 | −2.1813E+00 | 1.1503E+00 |
| R5 | −1.7959E+02 | 2.3037E−02 | −4.4074E−01 | 1.6752E+00 | −2.8499E+00 | 2.1423E+00 |
| R6 | −1.0933E+02 | 7.4344E−02 | −4.1258E−01 | 9.3556E−01 | −7.5212E−01 | 1.9093E−01 |
| R7 | −8.9614E+01 | 1.2328E−01 | −6.1150E−01 | 8.1657E−01 | 5.5696E−01 | −1.6114E+00 |
| R8 | −1.5446E+00 | 2.4769E−02 | −2.3578E−01 | 3.2328E−01 | 4.9686E−01 | −8.2311E−01 |
| R9 | 5.6181E+00 | 2.8975E−01 | −6.1989E−01 | 4.8227E−01 | 8.2567E−01 | −3.8230E+00 |
| R10 | −2.9642E+01 | 2.8625E−01 | −6.0597E−01 | 6.3843E−01 | −2.5051E−01 | −3.4098E−01 |
| R11 | −3.1627E+00 | −6.1862E−02 | 1.6630E−01 | −1.7861E−01 | 3.2413E−01 | −5.0655E−01 |
| R12 | −5.0822E+00 | −1.3882E−01 | 3.9263E−01 | −6.6408E−01 | 1.1609E+00 | −1.5067E+00 |
| R13 | 2.2788E+00 | −5.2209E−02 | −3.6681E−02 | 7.3786E−02 | −7.6585E−02 | 5.0145E−02 |
| R14 | 1.6602E+00 | 3.2693E−02 | −1.7264E−01 | 2.3701E−01 | −1.8982E−01 | 9.7046E−02 |
| R15 | −3.5835E+00 | 1.2533E−01 | −3.4320E−01 | 4.2086E−01 | −3.1336E−01 | 1.4957E−01 |
| R16 | −7.8952E+01 | 8.5397E−03 | −8.6770E−02 | 9.3487E−02 | −5.8742E−02 | 2.3628E−02 |
| | Conic coefficient | Aspheric surface coefficients | | | |
| | k | A14 | A16 | A18 | A20 |
| R1 | −6.2931E−02 | 5.6850E−03 | −1.0157E−02 | 5.7845E−03 | −1.2658E−03 |
| R2 | 6.8435E+01 | −2.3117E−01 | 1.2367E−02 | 2.2093E−02 | −5.3084E−03 |
| R3 | −8.9662E+01 | −1.7682E−01 | −1.1108E−01 | 8.7662E−02 | −1.7526E−02 |
| R4 | −2.0000E+02 | 7.8552E−01 | −1.5650E+00 | 9.0298E−01 | −1.8926E−01 |
| R5 | −1.7959E+02 | 9.1063E−02 | −1.3593E+00 | 9.2657E−01 | −2.1061E−01 |
| R6 | −1.0933E+02 | −1.8648E+00 | 4.4248E+00 | −3.6784E+00 | 1.0737E+00 |
| R7 | −8.9614E+01 | −1.2979E+00 | 5.2397E+00 | −4.5766E+00 | 1.3585E+00 |

TABLE 2-continued

| | | | | | |
|---|---|---|---|---|---|
| R8 | −1.5446E+00 | −7.0568E−01 | 2.6673E+00 | −2.5435E+00 | 8.3318E−01 |
| R9 | 5.6181E+00 | 8.0546E+00 | −1.0422E+01 | 7.5692E+00 | −2.3873E+00 |
| R10 | −2.9642E+01 | 4.5775E−01 | −1.7334E−01 | −2.1655E−02 | 2.5837E−02 |
| R11 | −3.1627E+00 | 5.1034E−01 | −3.1977E−01 | 1.1627E−01 | −1.8847E−02 |
| R12 | −5.0822E+00 | 1.3871E+00 | −8.7048E−01 | 3.3064E−01 | −5.6321E−02 |
| R13 | 2.2788E+00 | −2.1219E−02 | 6.5243E−03 | −1.4420E−03 | 1.6010E−04 |
| R14 | 1.6602E+00 | −3.2304E−02 | 6.9032E−03 | −8.7317E−04 | 5.0060E−05 |
| R15 | −3.5835E+00 | −4.6281E−02 | 8.9845E−03 | −9.8884E−04 | 4.6773E−05 |
| R16 | −7.8952E+01 | −6.2241E−03 | 1.0448E−03 | −1.0208E−04 | 4.4537E−06 |

In table 2, K is a conic coefficient, and A4, A6, A8, A10, A12, A14, A16, A18 and A20 are aspheric surface coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (4)$$

Herein, x denotes a vertical distance between a point in the aspheric curve and the optical axis, and y denotes an aspheric depth (i.e. a vertical distance between the point having a distance of x from the optical axis and a plane tangent to the vertex on the optical axis of the aspheric surface).

For convenience, an aspheric surface of each lens surface uses the aspheric surfaces shown in the above formula (4). However, the present disclosure is not limited to the aspheric polynomials form shown in the formula (4).

Table 3 and Table 4 show design data of inflexion points and arrest points of each lens of the camera optical lens 10 according to Embodiment 1. P1R1 and P1R2 represent the object-side surface and the image-side surface of the first lens L1, P2R1 and P2R2 represent the object-side surface and the image-side surface of the second lens L2, P3R1 and P3R2 represent the object-side surface and the image-side surface of the third lens L3, P4R1 and P4R2 represent the object-side surface and the image-side surface of the fourth lens L4, P5R1 and P5R2 represent the object-side surface and the image-side surface of the fifth lens L5, P6R1 and P6R2 represent the object-side surface and the image-side surface of the sixth lens L6, P7R1 and P7R2 represent the object-side surface and the image-side surface of the seventh lens L7, and P8R1 and P8R2 represent the object-side surface and the image-side surface of the eighth lens L8. The data in the column named "inflexion point position" refer to vertical distances from inflexion points arranged on each lens surface to the optic axis of the camera optical lens 10. The data in the column named "arrest point position" refer to vertical distances from arrest points arranged on each lens surface to the optical axis of the camera optical lens 10.

TABLE 3

| | Number(s) of inflexion points | Inflexion point position 1 | Inflexion point position 2 | Inflexion point position 3 |
|---|---|---|---|---|
| P1R1 | 0 | / | / | / |
| P1R2 | 2 | 0.575 | 1.065 | / |
| P2R1 | 2 | 0.595 | 1.145 | / |
| P2R2 | 3 | 0.065 | 0.445 | 0.595 |
| P3R1 | 2 | 0.295 | 0.515 | / |
| P3R2 | 2 | 0.655 | 0.915 | / |
| P4R1 | 2 | 0.795 | 0.935 | / |
| P4R2 | 0 | / | / | / |
| P5R1 | 0 | / | / | / |
| P5R2 | 2 | 0.295 | 0.545 | / |
| P6R1 | 0 | / | / | / |
| P6R2 | 0 | / | / | / |
| P7R1 | 1 | 1.425 | / | / |

TABLE 3-continued

| | Number(s) of inflexion points | Inflexion point position 1 | Inflexion point position 2 | Inflexion point position 3 |
|---|---|---|---|---|
| P7R2 | 1 | 1.595 | / | / |
| P8R1 | 1 | 1.635 | / | / |
| P8R2 | 1 | 2.045 | / | / |

TABLE 4

| | Number(s) of arrest points | Arrest point position 1 | Arrest point position 2 |
|---|---|---|---|
| | 0 | / | / |
| | 0 | 2 | 0.995 | 1.105 |
| | 1 | 1 | 0.935 | / |
| | 0 | 1 | 0.105 | / |
| | 0 | 0 | / | / |
| | 0 | 0 | / | / |
| | 0 | 0 | / | / |
| | 0 | 0 | / | / |
| | 2 | 0 | / | / |
| | 0 | 0 | / | / |
| | 0 | 0 | / | / |
| | 0 | 0 | / | / |
| | 0 | 0 | / | / |
| | 1 | 0 | / | / |
| | 2 | 1 | 1.965 | / |
| | 1 | 0 | / | / |

Figure 2:
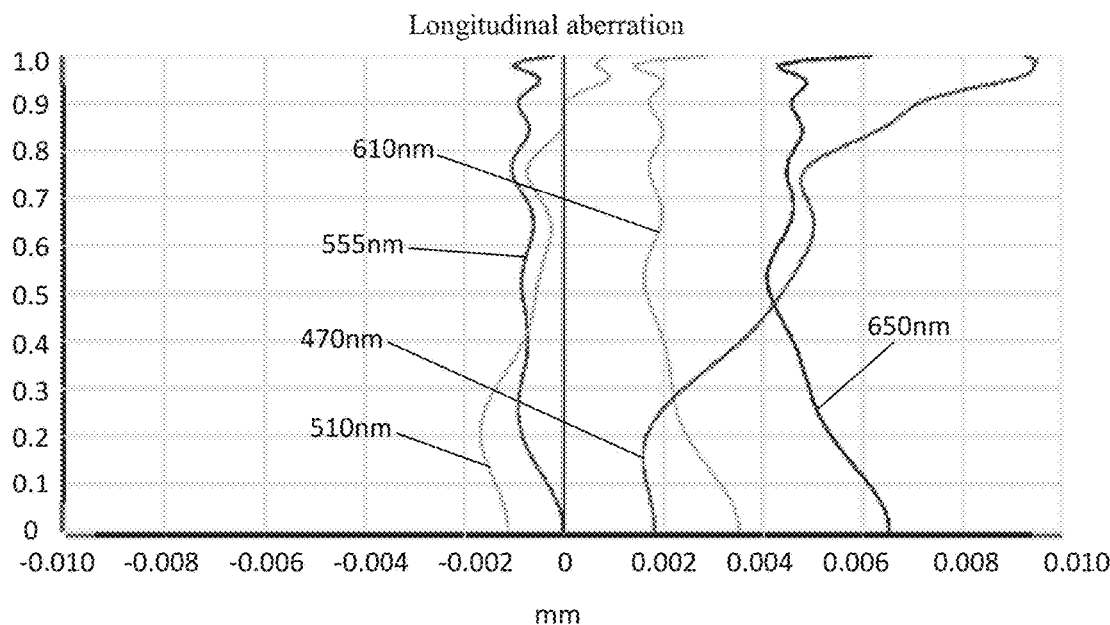
FIG. 2 is a schematic diagram of a longitudinal aberration of the camera optical lens shown in FIG. 1.
Figure 3:
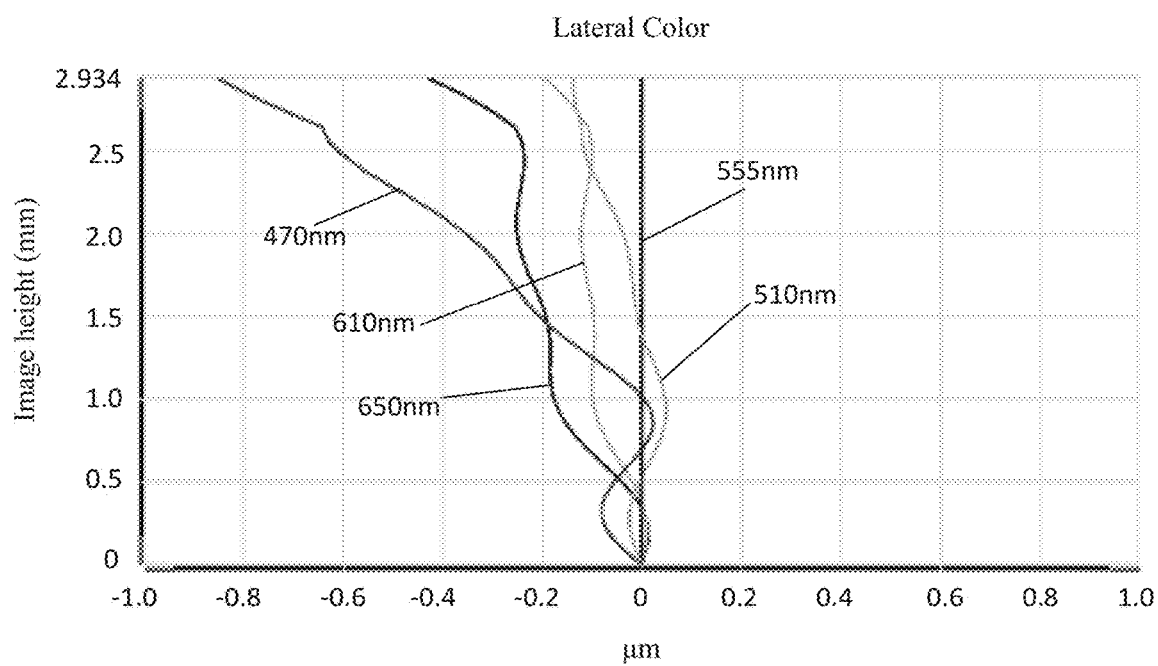
FIG. 3 is a schematic diagram of a lateral color of the camera optical lens shown in FIG. 1.
Figure 4:
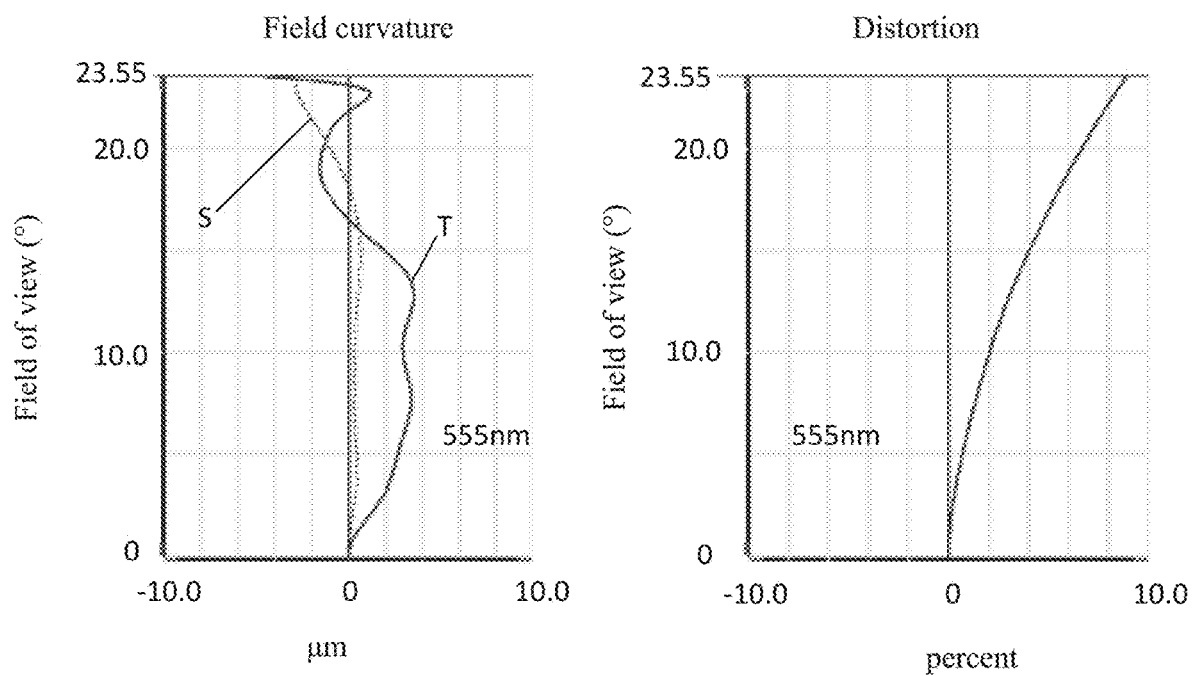
FIG. 4 is a schematic diagram of a field curvature and a distortion of the camera optical lens shown in FIG. 1.

FIG. 2 and FIG. 3 illustrate a longitudinal aberration and a lateral color of light with wavelengths of 650 nm, 610 nm, 555 nm, 510 nm and 470 nm after passing the camera optical lens 10, respectively. FIG. 4 illustrates a field curvature and a distortion with a wavelength of 555 nm after passing the camera optical lens 10. A field curvature S in FIG. 4 is a field curvature in a sagittal direction, and T is a field curvature in a tangential direction.

In the subsequent Table 13, various parameters of Embodiments 1, 2 and 3 and values corresponding to the parameters specified in the above conditions are shown.

As shown in Table 13, Embodiment 1 satisfies the various conditions.

In this Embodiment, an entrance pupil diameter (ENPD) of the camera optical lens 10 is 2.492 mm, an image height of 1.0H is 2.934 mm, and a field of view (FOV) in a diagonal direction is 47.10°. Thus, the camera optical lens 10 achieves a long focal length and ultra-thinness, the on-axis and off-axis chromatic aberration is sufficiently corrected, thereby achieving excellent optical performance.

Embodiment 2

Figure 5:
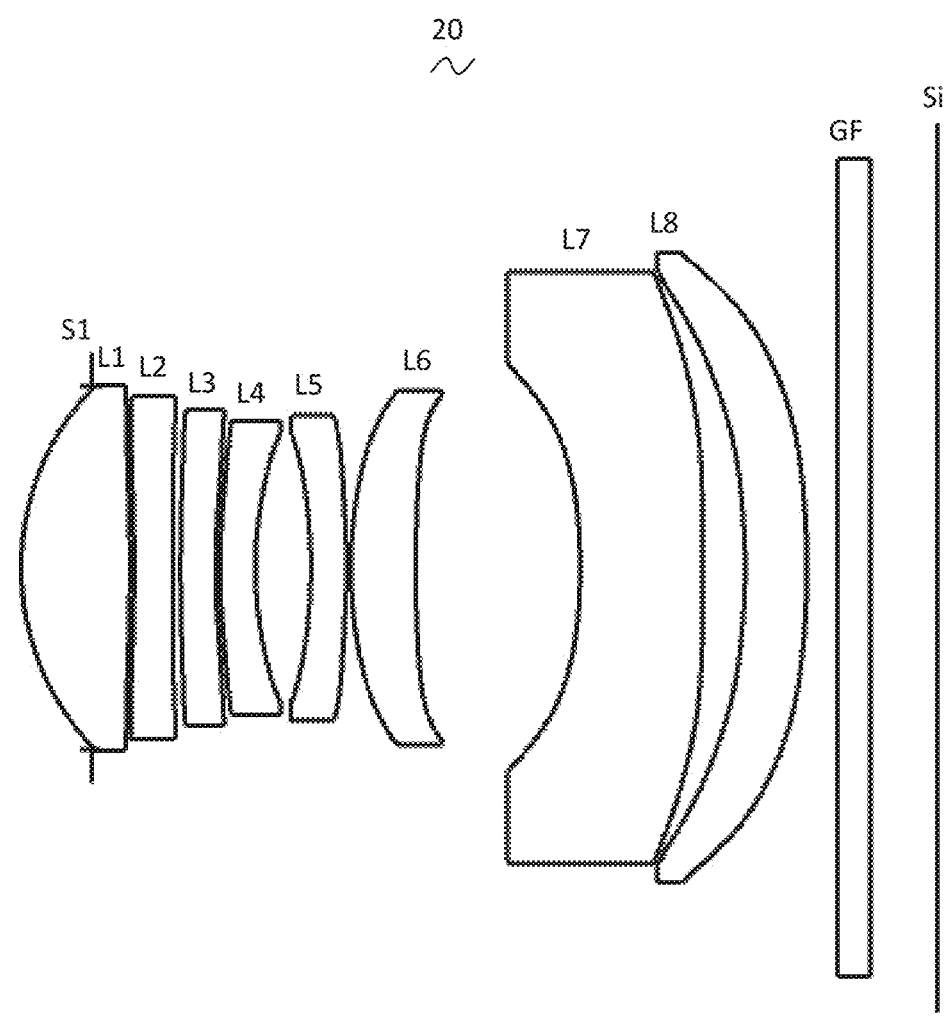
FIG. 5 is a schematic diagram of a structure of a camera optical lens according to Embodiment 2 of the present disclosure.

Embodiment 2, is basically the same as Embodiment 1 and involves symbols having the same meanings as Embodiment 1. Only differences are listed below Embodiment 2 provides a camera optical lens 20 structurally shown in FIG. 5. The seventh lens has a negative refractive power. The second lens L2 includes an image-side surface being concave in the paraxial region.

Table 5 and Table 6 show design data of a camera optical lens 20 in Embodiment 2 of the present disclosure.

TABLE 5

|  | R |  | d | nd |  | vd |
|---|---|---|---|---|---|---|
| S1 | ∞ | d0= | −0.456 |  |  |  |
| R1 | 1.746 | d1= | 0.708 | nd1 | 1.5444 v1 | 55.82 |
| R2 | −12.256 | d2= | 0.030 |  |  |  |
| R3 | −11.856 | d3= | 0.252 | nd2 | 1.6700 v2 | 19.39 |
| R4 | 863.826 | d4= | 0.050 |  |  |  |
| R5 | 12.175 | d5= | 0.230 | nd3 | 1.6153 v3 | 25.94 |
| R6 | 4.431 | d6= | 0.030 |  |  |  |
| R7 | 4.225 | d7= | 0.230 | nd4 | 1.6700 v4 | 19.39 |
| R8 | 2.488 | d8= | 0.364 |  |  |  |
| R9 | −2.936 | d9= | 0.230 | nd5 | 1.5444 v5 | 55.82 |
| R10 | −4.872 | d10= | 0.030 |  |  |  |
| R11 | 2.810 | d11= | 0.422 | nd6 | 1.6700 v6 | 19.39 |
| R12 | 7.338 | d12= | 1.073 |  |  |  |
| R13 | −4.305 | d13= | 0.803 | nd7 | 1.6700 v7 | 19.39 |
| R14 | −46.566 | d14= | 0.278 |  |  |  |
| R15 | −3.880 | d15= | 0.404 | nd8 | 1.5444 v8 | 55.82 |
| R16 | −4.619 | d16= | 0.200 |  |  |  |
| R17 | ∞ | d17= | 0.210 | ndg | 1.5168 vg | 64.17 |
| R18 | ∞ | d18= | 0.440 |  |  |  |

Table 6 shows aspheric surface data of each lens of the camera optical lens 20 in Embodiment 2 of the present disclosure.

Table 7 and table 8 show design data of inflexion points and arrest points of each lens of the camera optical lens 20 in Embodiment 2 of the present disclosure.

TABLE 7

|  | Number(s) of inflexion points | Inflexion point position 1 | Inflexion point position 2 |
|---|---|---|---|
| P1R1 | 0 | / | / |
| P1R2 | 1 | 0.615 | / |
| P2R1 | 2 | 0.625 | 1.075 |
| P2R2 | 0 | / | / |
| P3R1 | 0 | / | / |
| P3R2 | 2 | 0.515 | 0.885 |
| P4R1 | 2 | 0.855 | 0.895 |
| P4R2 | 0 | / | / |
| P5R1 | 0 | / | / |
| P5R2 | 0 | / | / |
| P6R1 | 0 | / | / |
| P6R2 | 0 | / | / |
| P7R1 | 1 | 1.295 | / |
| P7R2 | 1 | 1.895 | / |
| P8R1 | 1 | 1.805 | / |
| P8R2 | 1 | 1.985 | / |

TABLE 6

|  | Conic coefficient | Aspheric surface coefficients | | | | |
|---|---|---|---|---|---|---|
|  | k | A4 | A6 | A8 | A10 | A12 |
| R1 | −3.7519E−02 | 1.5876E−03 | 1.0237E−04 | 4.3631E−03 | −1.0079E−02 | 1.5861E−02 |
| R2 | 4.9589E+01 | 4.7267E−02 | −1.5156E−01 | 4.4845E−01 | −7.8388E−01 | 8.8232E−01 |
| R3 | −5.8300E+01 | 5.3821E−02 | −2.1226E−01 | 5.8984E−01 | −1.0030E+00 | 1.1354E+00 |
| R4 | 2.0000E+02 | 5.7438E−02 | −1.8986E−01 | 2.6449E−01 | 2.0713E−01 | −1.1876E+00 |
| R5 | −1.9993E+02 | −1.6385E−03 | 3.2117E−02 | −5.6805E−01 | 2.3349E+00 | −4.8346E+00 |
| R6 | −1.2477E+02 | 1.8271E−02 | 2.7471E−01 | −2.3716E+00 | 7.3932E+00 | −1.2055E+01 |
| R7 | −8.4369E+01 | 2.6643E−03 | 2.8376E−01 | −2.3215E+00 | 7.4536E+00 | −1.2207E+01 |
| R8 | −2.5305E+00 | −1.8958E−02 | 7.8613E−03 | −1.8415E−01 | 1.0440E+00 | −1.7100E+00 |
| R9 | 5.5502E+00 | 1.8299E−01 | −3.6358E−01 | 4.3569E−01 | −4.1217E−01 | 4.6165E−01 |
| R10 | −7.6725E+00 | 1.2738E−01 | −1.5785E−01 | 3.4137E−02 | −2.7860E−03 | 6.0355E−01 |
| R11 | −3.2388E+00 | −4.9714E−02 | 1.8252E−01 | −3.1356E−01 | 5.4854E−01 | −6.9565E−01 |
| R12 | −9.1818E+00 | −6.0488E−02 | 1.1983E−01 | −9.8670E−02 | 1.2740E−01 | −1.2551E−01 |
| R13 | 4.2691E+00 | −8.1030E−02 | 1.0361E−03 | −1.3040E−03 | 3.7867E−02 | −9.3711E−02 |
| R14 | 1.0396E+02 | −6.5457E−03 | −9.5590E−02 | 1.3289E−01 | −9.6764E−02 | 4.3216E−02 |
| R15 | −4.1553E+00 | 1.2371E−01 | −3.1950E−01 | 3.4078E−01 | −2.0681E−01 | 7.6695E−02 |
| R16 | −5.4782E+01 | 3.3830E−02 | −1.5291E−01 | 1.5090E−01 | −8.6608E−02 | 3.2355E−02 |

|  | Conic coefficient | Aspheric surface coefficients | | | |
|---|---|---|---|---|---|
|  | k | A14 | A16 | A18 | A20 |
| R1 | −3.7519E−02 | −1.7519E−02 | 1.2771E−02 | −5.6549E−03 | 1.1019E−03 |
| R2 | 4.9589E+01 | −6.6938E−01 | 3.3809E−01 | −1.0298E−01 | 1.4136E−02 |
| R3 | −5.8300E+01 | −8.9057E−01 | 4.7722E−01 | −1.5743E−01 | 2.3579E−02 |
| R4 | 2.0000E+02 | 1.7203E+00 | −1.2483E+00 | 4.5945E−01 | −6.7460E−02 |
| R5 | −1.9993E+02 | 5.7892E+00 | −4.0674E+00 | 1.5652E+00 | −2.5368E−01 |
| R6 | −1.2477E+02 | 1.0659E+01 | −4.5049E+00 | 3.3922E−01 | 2.4097E−01 |
| R7 | −8.4369E+01 | 1.0743E+01 | −4.5584E+00 | 3.7673E−01 | 2.3189E−01 |
| R8 | −2.5305E+00 | 1.2814E+00 | −3.2889E−01 | −1.2009E−01 | 5.1258E−02 |
| R9 | 5.5502E+00 | 7.0720E−03 | −1.1719E+00 | 1.5240E+00 | −6.4756E−01 |
| R10 | −7.6725E+00 | −1.7263E+00 | 2.0287E+00 | −1.1561E+00 | 2.6655E−01 |
| R11 | −3.2388E+00 | 5.8405E−01 | −3.0801E−01 | 9.2969E−02 | −1.2253E−02 |
| R12 | −9.1818E+00 | 1.2270E−01 | −9.5415E−02 | 4.3772E−02 | −8.2913E−03 |
| R13 | 4.2691E+00 | 1.0623E−01 | −6.4173E−02 | 2.0271E−02 | −2.6026E−03 |
| R14 | 1.0396E+02 | −1.2182E−02 | 2.1156E−03 | −2.0684E−04 | 8.7198E−06 |
| R15 | −4.1553E+00 | −1.7472E−02 | 2.3137E−03 | −1.5206E−04 | 3.0714E−06 |
| R16 | −5.4782E+01 | −8.1702E−03 | 1.3710E−03 | −1.4015E−04 | 6.6667E−06 |

TABLE 8

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 0 | / |
| P8R1 | 1 | 2.045 |
| P8R2 | 0 | / |

Figure 6:
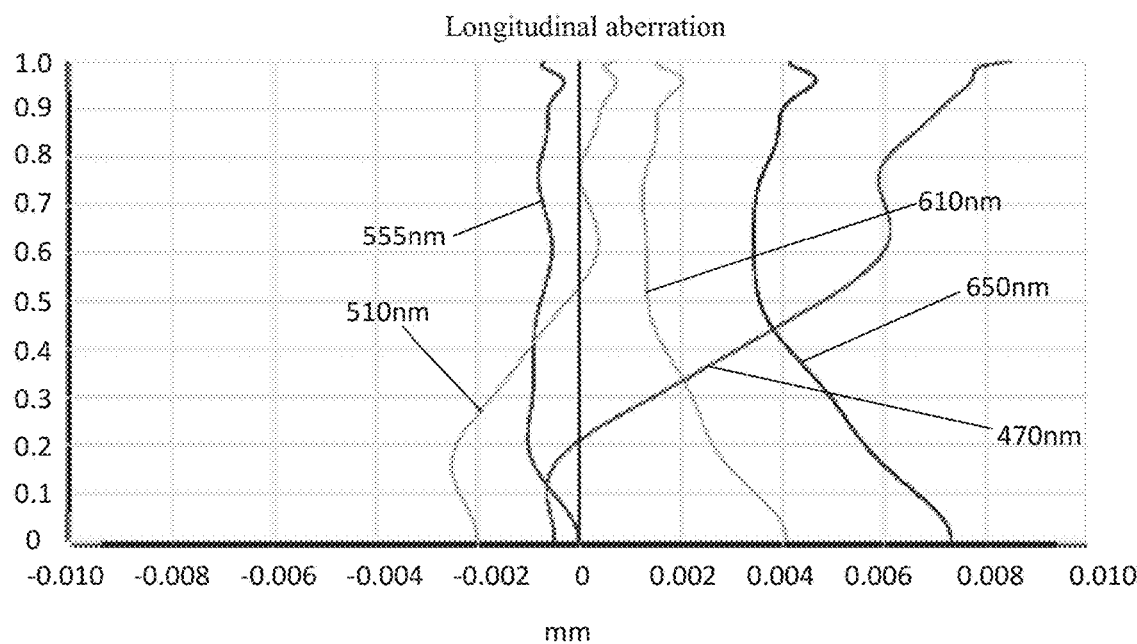
FIG. 6 is a schematic diagram of a longitudinal aberration of the camera optical lens shown in FIG. 5.
Figure 7:
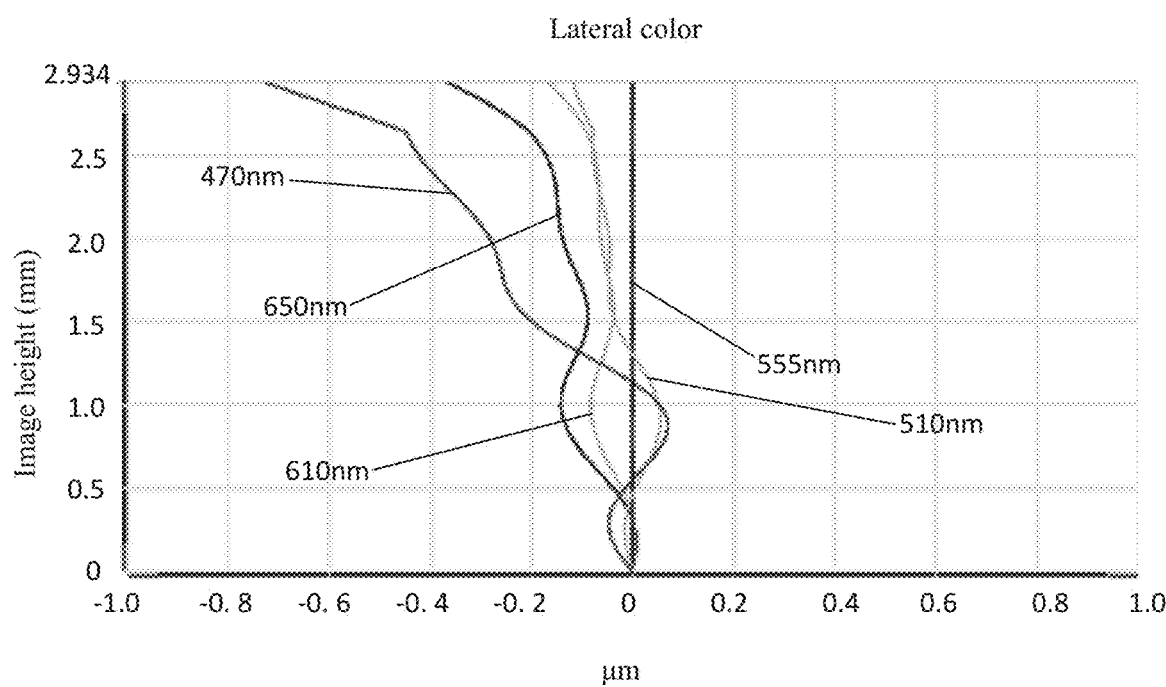
FIG. 7 is a schematic diagram of a lateral color of the camera optical lens shown in FIG. 5.
Figure 8:
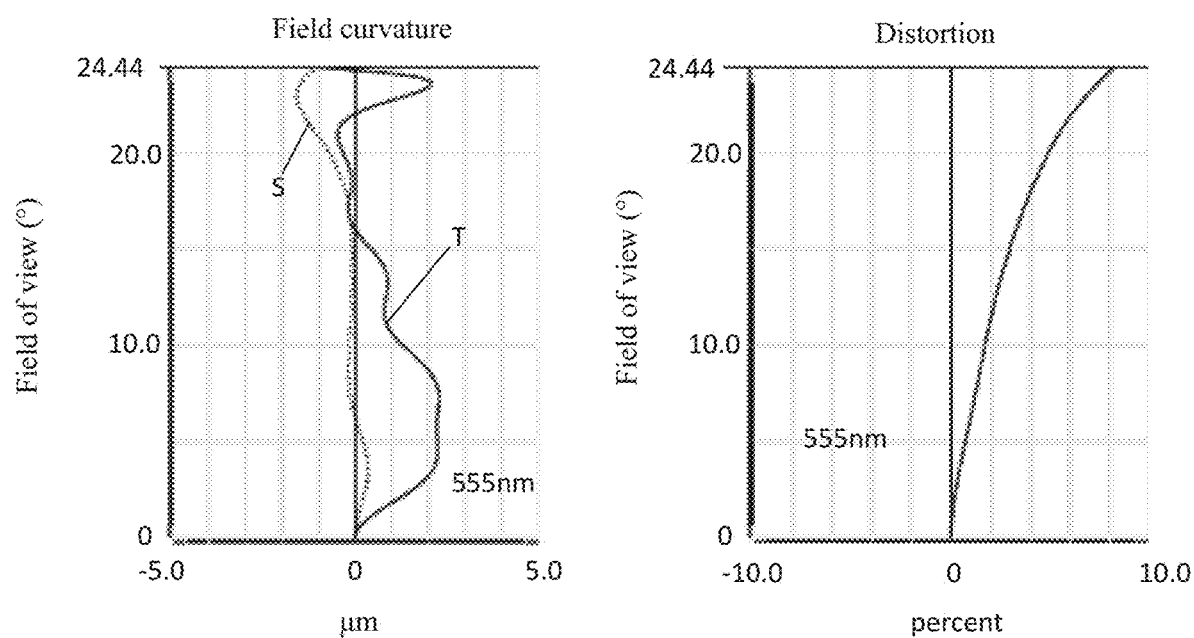
FIG. 8 is a schematic diagram of a field curvature and a distortion of the camera optical lens shown in FIG. 5.

FIG. 6 and FIG. 7 illustrate a longitudinal aberration and a lateral color of light with wavelengths of 650 nm, 610 nm, 555 nm, 510 nm and 470 nm after passing the camera optical lens 20, respectively. FIG. 8 illustrates a field curvature and a distortion of light with a wavelength of 555 nm after passing the camera optical lens 20. A field curvature S in FIG. 8 is a field curvature in a sagittal direction, and T is a field curvature in a tangential direction.

As shown in Table 13, Embodiment 2 satisfies the various conditions.

In this embodiment, an entrance pupil diameter (ENPD) of the camera optical lens 20 is 2.405 mm, an image height of 1.0 H is 2.934 mm, and a field of view (FOV) in the diagonal direction is 48.88°. Thus, the camera optical lens 20 achieves a long focal length and ultra-thinness, the on-axis and off-axis aberration is sufficiently corrected, thereby achieving excellent optical performance.

Embodiment 3

Embodiment 3 is basically the same as Embodiment 1 and involves symbols having the same meanings as Embodiment 1. Only differences are listed below.

Figure 9:
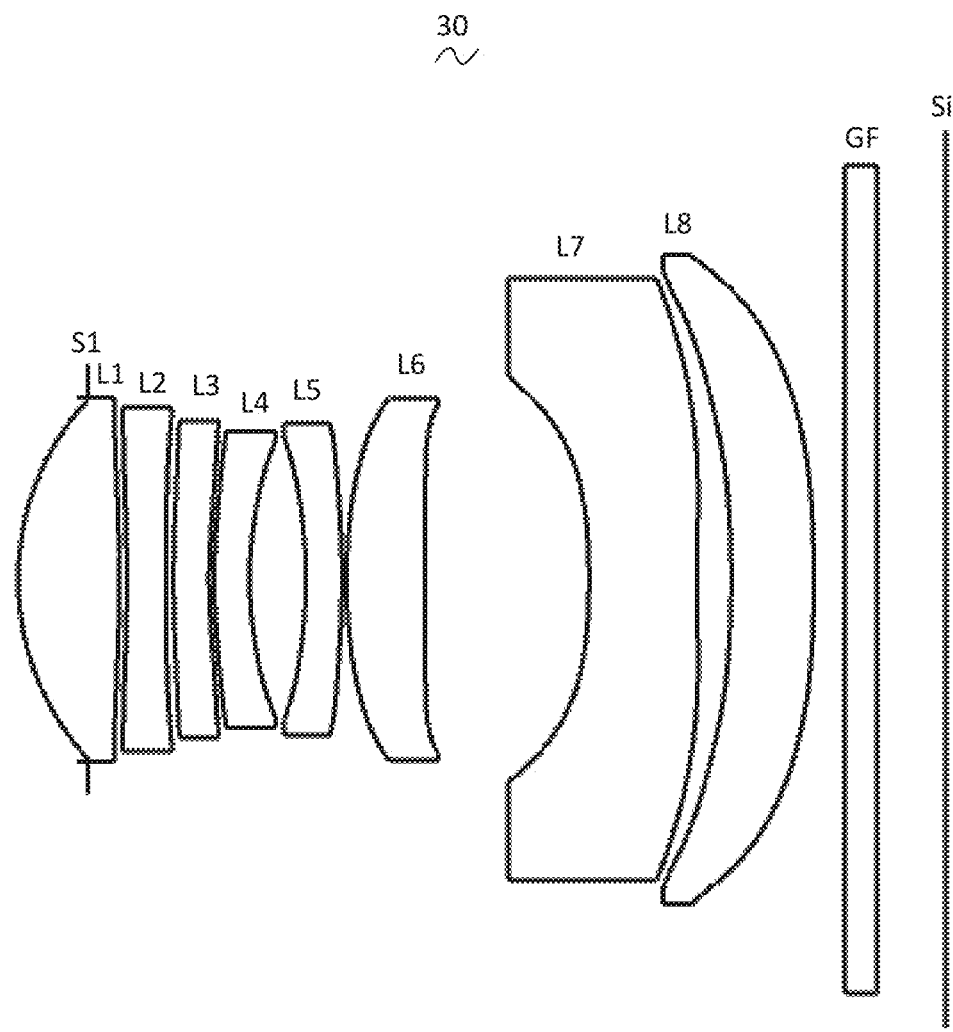
FIG. 9 is a schematic diagram of a structure of a camera optical lens according to Embodiment 3 of the present disclosure.

Embodiment 3 provides a camera optical lens 30 structurally shown in FIG. 9. In this embodiment, the seventh lens has a negative refractive power. The second lens includes an image-side surface being concave in the paraxial region. The seventh lens includes an image-side surface being concave in the paraxial region.

Table 9 and Table 10 show design data of a camera optical lens 30 in Embodiment 3 of the present disclosure.

TABLE 9

| | R | d | | nd | | vd |
|---|---|---|---|---|---|---|
| S1 | ∞ | d0= | −0.453 | | | |
| R1 | 1.779 | d1= | 0.653 | nd1 | 1.5444 | v1 | 55.82 |
| R2 | −10.346 | d2= | 0.049 | | | |
| R3 | −10.154 | d3= | 0.250 | nd2 | 1.6700 | v2 | 19.39 |
| R4 | 26.566 | d4= | 0.051 | | | |
| R5 | 7.299 | d5= | 0.230 | nd3 | 1.6153 | v3 | 25.94 |
| R6 | 3.637 | d6= | 0.033 | | | |
| R7 | 3.428 | d7= | 0.230 | nd4 | 1.6700 | v4 | 19.39 |
| R8 | 2.410 | d8= | 0.365 | | | |
| R9 | −2.920 | d9= | 0.232 | nd5 | 1.5444 | v5 | 55.82 |
| R10 | −5.135 | d10= | 0.030 | | | |
| R11 | 3.472 | d11= | 0.507 | nd6 | 1.6700 | v6 | 19.39 |
| R12 | 45.432 | d12= | 1.061 | | | |
| R13 | −4.579 | d13= | 0.699 | nd7 | 1.6700 | v7 | 19.39 |
| R14 | 16.349 | d14= | 0.219 | | | |
| R15 | −6.110 | d15= | 0.536 | nd8 | 1.5444 | v8 | 55.82 |
| R16 | −6.755 | d16= | 0.200 | | | |
| R17 | ∞ | d17= | 0.210 | ndg | 1.5168 | vg | 64.17 |
| R18 | ∞ | d18= | 0.442 | | | |

Table 10 shows aspheric surface data of each lens of the camera optical lens 30 in Embodiment 3 of the present disclosure.

TABLE 10

| | Conic coefficient | Aspheric surface coefficients | | | | |
|---|---|---|---|---|---|---|
| | k | A4 | A6 | A8 | A10 | A12 |
| R1 | −9.6177E−03 | 2.9687E−03 | −2.2295E−03 | 1.7588E−02 | −5.4340E−02 | 1.0589E−01 |
| R2 | 4.2934E+01 | 4.6433E−02 | −1.0981E−01 | 3.1424E−01 | −5.5873E−01 | 6.2629E−01 |
| R3 | −6.6851E+01 | 4.3533E−02 | −1.5612E−01 | 4.9590E−01 | −9.6895E−01 | 1.2274E+00 |
| R4 | −2.0000E+02 | 3.3667E−02 | −1.0693E−01 | 1.6261E−01 | 1.4964E−01 | −8.6887E−01 |
| R5 | −1.8466E+02 | 2.6120E−02 | −5.1640E−02 | −4.3397E−01 | 1.9921E+00 | −4.0635E+00 |
| R6 | −1.0772E+02 | 4.8706E−02 | −8.8803E−02 | −4.6204E−01 | 1.2595E+00 | −2.6114E−02 |
| R7 | −8.4769E+01 | 2.0855E−02 | 8.8411E−03 | −4.4292E−01 | 9.8155E−01 | 3.8653E−01 |
| R8 | −3.1935E+00 | −5.2148E−02 | 1.5184E−01 | −3.4618E−01 | 7.7783E−01 | −9.3046E−01 |
| R9 | 5.3462E+00 | 1.3174E−01 | −2.1945E−01 | 2.8156E−01 | −3.4143E−01 | 2.7948E−01 |
| R10 | −5.6386E+00 | 7.5772E−02 | −2.6526E−02 | −1.0252E−01 | 7.3607E−02 | 4.2364E−01 |
| R11 | −3.2315E+00 | −4.2048E−02 | 1.7145E−01 | −3.0186E−01 | 5.1016E−01 | −6.2363E−01 |
| R12 | −1.8017E+02 | −4.0321E−02 | 5.7090E−02 | 1.4779E−02 | −9.9665E−02 | 2.3820E−01 |
| R13 | 7.1026E+00 | −1.0205E−01 | 2.2240E−01 | −8.1715E−03 | 6.5962E−02 | −1.3189E−01 |
| R14 | −7.5811E+01 | −2.7698E−02 | −9.0162E−02 | 1.3553E−01 | −9.6261E−02 | 4.0534E−02 |
| R15 | −5.6274E+00 | 6.7515E−02 | −2.1813E−01 | 2.4744E−01 | −1.5015E−01 | 5.3847E−02 |
| R16 | −7.6804E+01 | 5.1997E−03 | −9.6606E−02 | 1.0743E−01 | −6.8872E−02 | 2.9053E−02 |

| | Conic coefficient | Aspheric surface coefficients | | | |
|---|---|---|---|---|---|
| | k | A14 | A16 | A18 | A20 |
| R1 | −9.6177E−03 | −1.2819E−01 | 9.3734E−02 | −3.8237E−02 | 6.7156E−03 |
| R2 | 4.2934E+01 | −4.4463E−01 | 1.9249E−01 | −4.5163E−02 | 4.1948E−03 |
| R3 | −6.6851E+01 | −1.0176E+00 | 5.3215E−01 | −1.5821E−01 | 2.0040E−02 |
| R4 | −2.0000E+02 | 1.4491E+00 | −1.3287E+00 | 6.6284E−01 | −1.3849E−01 |
| R5 | −1.8466E+02 | 4.9547E+00 | −3.7841E+00 | 1.6844E+00 | −3.2927E−01 |
| R6 | −1.0772E+02 | −3.4543E+00 | 5.0918E+00 | −3.1220E+00 | 7.4783E−01 |

TABLE 10-continued

| | | | | | |
|---|---|---|---|---|---|
| R7 | −8.4769E+01 | −3.6765E+00 | 5.0599E+00 | −3.0933E+00 | 7.6015E−01 |
| R8 | −3.1935E+00 | 5.3430E−01 | 7.9784E−02 | −3.3155E−01 | 1.3042E−01 |
| R9 | 5.3462E+00 | 5.0403E−01 | −1.6226E+00 | 1.6566E+00 | −6.4159E−01 |
| R10 | −5.6386E+00 | −1.1736E+00 | 1.3174E+00 | −7.3599E−01 | 1.6862E−01 |
| R11 | −3.2315E+00 | 5.0954E−01 | −2.6241E−01 | 7.6992E−02 | −9.7162E−03 |
| R12 | −1.8017E+02 | −3.0055E−01 | 2.2666E−01 | −9.5839E−02 | 1.7738E−02 |
| R13 | 7.1026E+00 | 1.2892E−01 | −6.7611E−02 | 1.7846E−02 | −1.7504E−03 |
| R14 | −7.5811E+01 | −1.0567E−02 | 1.6711E−03 | −1.4650E−04 | 5.4438E−06 |
| R15 | −5.6274E+00 | −1.1633E−02 | 1.4445E−03 | −8.8717E−05 | 1.7000E−06 |
| R16 | −7.6804E+01 | −8.2786E−03 | 1.5306E−03 | −1.6517E−04 | 7.8758E−06 |

Table 11 and Table 12 show design data of inflexion points and arrest points of each lens in the camera optical lens 30 in Embodiment 3 of the present disclosure.

TABLE 11

| | Number(s) of inflexion points | Inflexion point position 1 | Inflexion point position 2 |
|---|---|---|---|
| P1R1 | 0 | / | / |
| P1R2 | 1 | 0.685 | / |
| P2R1 | 2 | 0.595 | 1.075 |
| P2R2 | 0 | / | / |
| P3R1 | 2 | 0.515 | 0.835 |
| P3R2 | 2 | 0.475 | 0.865 |
| P4R1 | 2 | 0.835 | 0.945 |
| P4R2 | 0 | / | / |
| P5R1 | 0 | / | / |
| P5R2 | 0 | / | / |
| P6R1 | 0 | / | / |
| P6R2 | 2 | 0.245 | 0.485 |
| P7R1 | 1 | 1.315 | / |
| P7R2 | 1 | 0.335 | / |
| P8R1 | 1 | 1.875 | / |
| P8R2 | 1 | 2.065 | / |

TABLE 12

| | Number(s) of arrest points | Arrest point position 1 |
|---|---|---|
| P1R1 | 0 | / |
| P1R2 | 0 | / |
| P2R1 | 0 | / |
| P2R2 | 0 | / |
| P3R1 | 0 | / |
| P3R2 | 0 | / |
| P4R1 | 0 | / |
| P4R2 | 0 | / |
| P5R1 | 0 | / |
| P5R2 | 0 | / |
| P6R1 | 0 | / |
| P6R2 | 0 | / |
| P7R1 | 0 | / |
| P7R2 | 1 | 0.545 |
| P8R1 | 0 | / |
| P8R2 | 0 | / |

Figure 10:
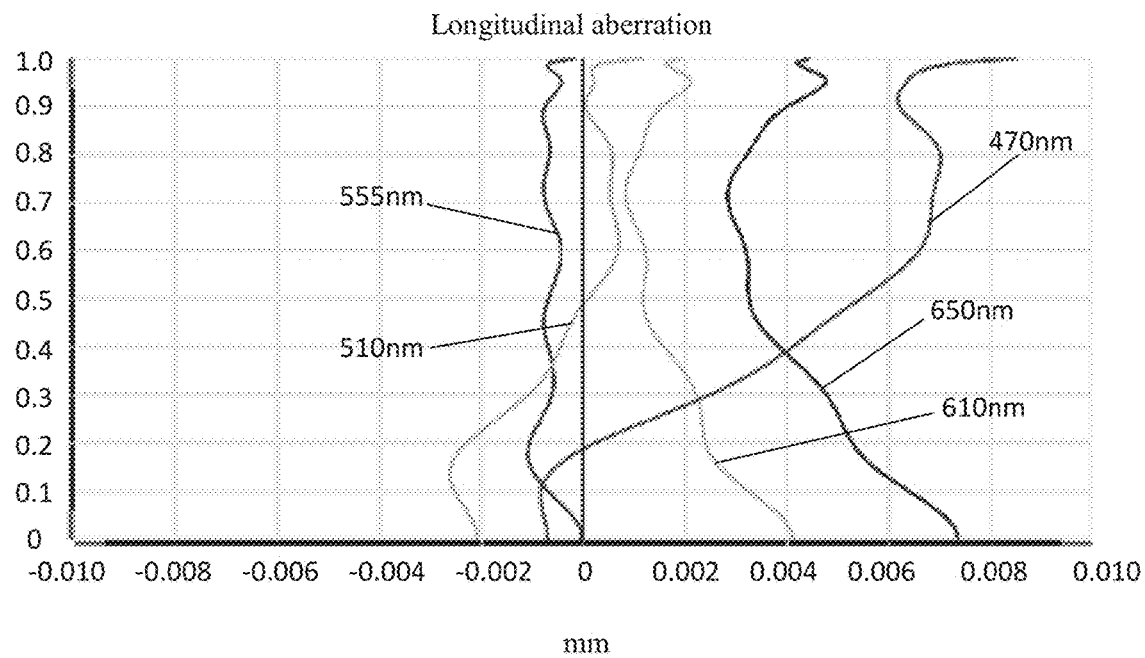
FIG. 10 is a schematic diagram of a longitudinal aberration of the camera optical lens shown in FIG. 9.
Figure 11:
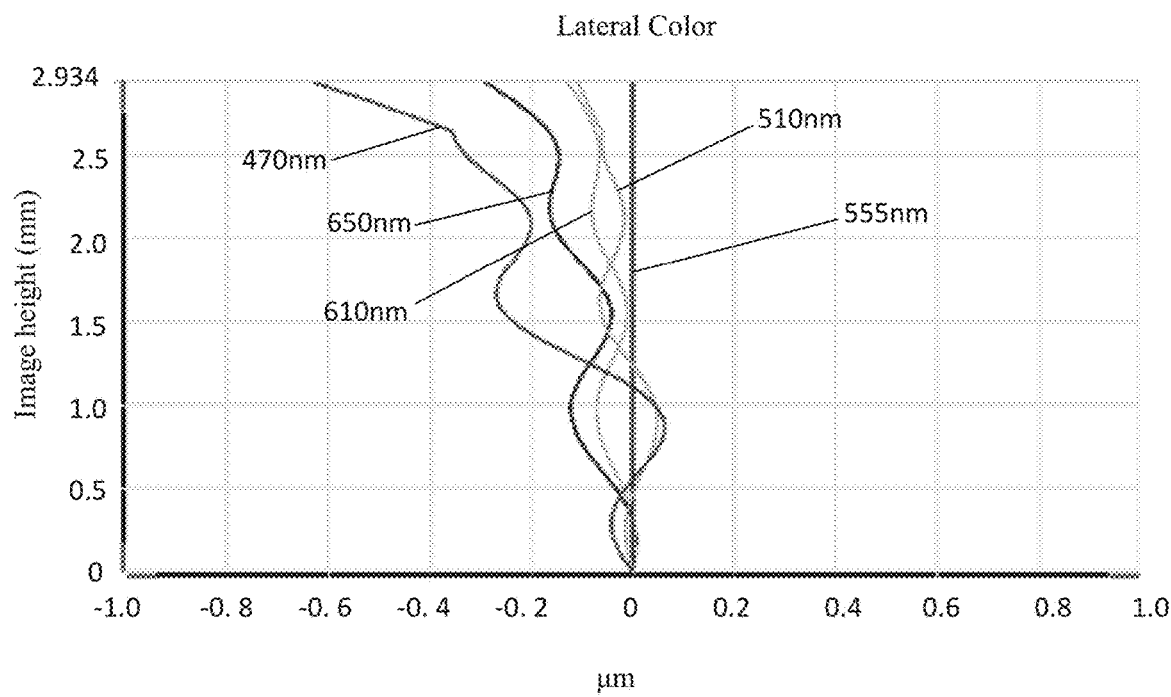
FIG. 11 is a schematic diagram of a lateral color of the camera optical lens shown in FIG. 9.
Figure 12:
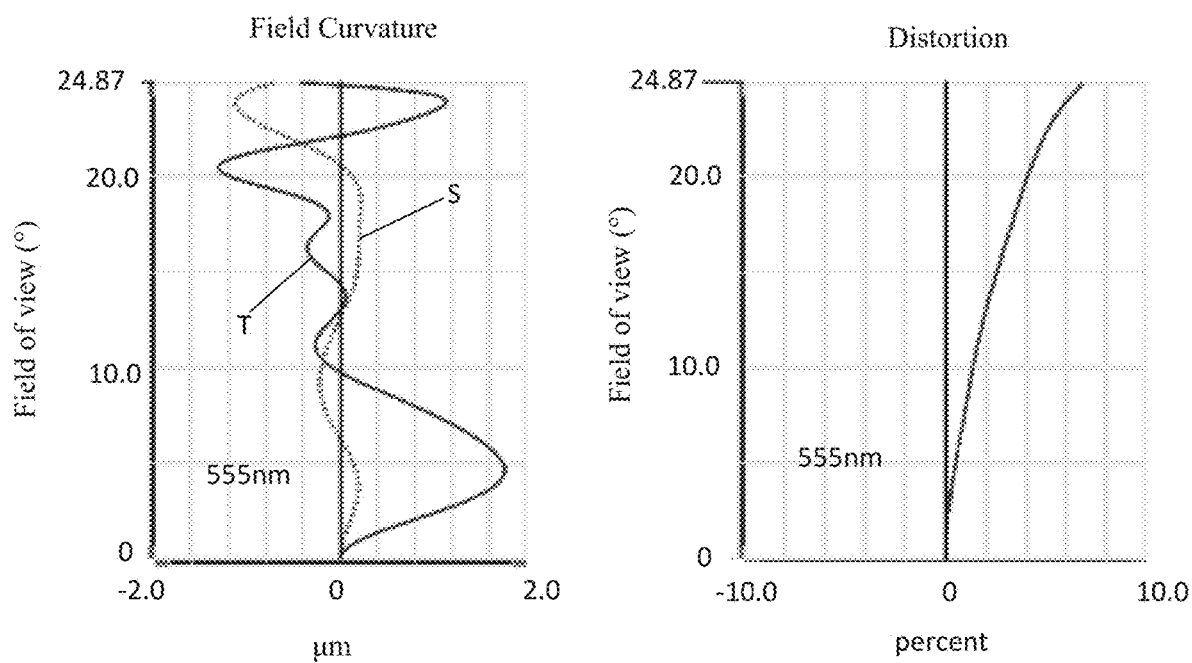
FIG. 12 is a schematic diagram of a field curvature and a distortion of the camera optical lens shown in FIG. 9.

FIG. 10 and FIG. 11 illustrate a longitudinal aberration and a lateral color of light with wavelengths of 650 nm, 61 nm, 555 nm, 53 nm and 470 nm after passing the camera optical lens 30, respectively. FIG. 12 illustrates a field curvature and a distortion of light with a wavelength of 555 m after passing the camera optical lens 30. A field curvature S in FIG. 12 is a field curvature in a sagittal direction, and T is a field curvature in a tangential direction.

Table 13 in the following shows values corresponding to the conditions according to the above conditions in the embodiments. Apparently, the camera optical lens 30 in the present embodiment satisfies the above conditions.

In this embodiment, an entrance pupil diameter (ENPD) of the camera optical lens 30 is 2.387 mm, an image height of 1.0H is 2.934 mm, and a field of view (FOV) in the diagonal direction is 49.74°. Thus, the camera optical lens 30 achieves a long focal length and ultra-thinness, the on-axis and off-axis aberration is sufficiently corrected, thereby achieving excellent optical performance.

TABLE 13

| Parameters and conditions | Embodiment 1 | Embodiment 2 | Embodiment 3 |
|---|---|---|---|
| f/TTL | 1.04 | 1.00 | 0.99 |
| f2/f | −3.95 | −2.90 | −1.83 |
| (R15 + R16)/(R15 − R16) | −3.05 | −11.50 | −19.95 |
| f | 6.179 | 5.963 | 5.920 |
| f1 | 2.819 | 2.849 | 2.833 |
| f2 | −24.410 | −17.294 | −10.834 |
| f3 | −9.925 | −11.373 | −11.989 |
| f4 | −9.142 | −9.453 | −13.193 |
| f5 | −16.472 | −14.125 | −12.872 |
| f6 | 12.435 | 6.489 | 5.533 |
| f7 | 523.961 | −7.069 | −5.219 |
| f8 | −10.864 | −55.016 | −165.891 |
| f12 | 3.117 | 3.310 | 3.628 |
| FNO | 2.48 | 2.48 | 2.48 |
| TTL | 5.968 | 5.984 | 5.997 |
| IH | 2.934 | 2.934 | 2.934 |
| FOV | 47.10° | 48.88° | 49.74° |

It will be understood by those of ordinary skill in the art that the embodiments described above are specific examples realizing the present disclosure, and that in practical applications, various changes may be made thereto in form and in detail without departing from the range and scope of the disclosure.

What is claimed is:

1. A camera optical lens comprising eight lenses, from an object side to an image side in sequence: a first lens having a positive refractive power, a second lens having a negative refractive power, a third lens having a negative refractive power, a fourth lens having a negative refractive power, a fifth lens having a negative refractive power, a sixth lens having a positive refractive power, a seventh lens, and an eighth lens having a negative refractive power; wherein the camera optical lens satisfies the following conditions:

$$0.95 \leq f/TTL;$$

$$-4.00 \leq f2/f \leq -1.80; \text{ and}$$

$$-20.00 \leq (R15+R16)/(R15-R16) \leq -3.00;$$

where

TTL denotes a total optical length from an object-side surface of the first lens to an image surface of the camera optical lens along an optical axis;

f denotes a focal length of the camera optical lens;

f2 denotes a focal length of the second lens;

R15 denotes a central curvature radius of an object-side surface of the eighth lens; and R16 denotes a central curvature radius of an image-side surface of the eighth lens.

2. The camera optical lens according to claim 1, wherein the camera optical lens further satisfies the following condition:

$$0.90 \leq f6/f \leq 2.50;$$

where f6 denotes a focal length of the sixth lens.

3. The camera optical lens according to claim 1, wherein the camera optical lens further satisfies the following conditions:

$$0.23 \leq f1/f \leq 0.72;$$

$$-1.61 \leq (R1+R2)/(R1-R2) \leq -0.47; \text{ and}$$

$$0.05 \leq d1/TTL \leq 0.20;$$

where f1 denotes a focal length of the first lens;

R1 denotes a central curvature radius of an object-side surface of the first lens;

R2 denotes a central curvature radius of an image-side surface of the first lens; and d1 denotes an on-axis thickness of the first lens.

4. The camera optical lens according to claim 1, wherein the camera optical lens further satisfies the following conditions:

$$-2.33 \leq (R3+R4)/(R3-R4) \leq -0.30; \text{ and}$$
$$0.02 \leq d3/TTL \leq 0.06;$$

where

R3 denotes a central curvature radius of an object-side surface of the second lens;

R4 denotes a central curvature radius of an image-side surface of the second lens; and d3 denotes an on-axis thickness of the second lens.

5. The camera optical lens according to claim 1, wherein the camera optical lens further satisfies the following conditions:

$$-4.05 \leq f3/f \leq -1.07;$$

$$0.67 \leq (R5+R6)/(R5-R6) \leq 4.48; \text{ and}$$

$$0.02 \leq d5/TTL \leq 0.06;$$

where f3 denotes a focal length of the third lens;

R5 denotes a central curvature radius of an object-side surface of the third lens;

R6 denotes a central curvature radius of an image-side surface of the third lens; and d5 denotes an on-axis thickness of the third lens.

6. The camera optical lens according to claim 1, wherein the camera optical lens further satisfies the following conditions:

$$-4.46 \leq f4/f \leq -0.99;$$

$$1.68 \leq (R7+R8)/(R7-R8) \leq 8.60; \text{ and}$$

$$0.02 \leq d7/TTL \leq 0.06;$$

where f4 denotes a focal length of the fourth lens;

R7 denotes a central curvature radius of an object-side surface of the fourth lens;

R8 denotes a central curvature radius of an image-side surface of the fourth lens; and d7 denotes an on-axis thickness of the fourth lens.

7. The camera optical lens according to claim 1, wherein the camera optical lens further satisfies the following conditions:

$$-5.33 \leq f5/f \leq -1.45;$$

$$-9.27 \leq (R9+R10)/(R9-R10) \leq -2.42; \text{ and}$$

$$0.02 \leq d9/TTL \leq 0.06;$$

where f5 denotes a focal length of the fifth lens;

R9 denotes a central curvature radius of an object-side surface of the fifth lens;

R10 denotes a central curvature radius of an image-side surface of the fifth lens; and d9 denotes an on-axis thickness of the fifth lens.

8. The camera optical lens according to claim 1, wherein the camera optical lens further satisfies the following conditions:

$$-14.57 \leq (R11+R12)/(R11-R12) \leq -0.78; \text{ and}$$

$$0.02 \leq d11/TTL \leq 0.13;$$

where

R11 denotes a central curvature radius of an object-side surface of the sixth lens;

R12 denotes a central curvature radius of an image-side surface of the sixth lens; and d11 denotes an on-axis thickness of the sixth lens.

9. The camera optical lens according to claim 1, wherein the camera optical lens further satisfies the following conditions:

$$-2.37 \leq f7/f \leq 127.2;$$

$$-133.01 \leq (R13+R14)/(R13-R14) \leq -0.37; \text{ and}$$

$$0.04 \leq d13/TTL \leq 0.20;$$

where f7 denotes a focal length of the seventh lens;

R13 denotes a central curvature radius of an object-side surface of the seventh lens;

R14 denotes a central curvature radius of an image-side surface of the seventh lens; and d13 denotes an on-axis thickness of the seventh lens.

10. The camera optical lens according to claim 1, wherein the camera optical lens further satisfies the following conditions:

$$-56.04 \leq f8/f \leq -1.17; \text{ and}$$

$$0.03 \leq d15/TTL \leq 0.13;$$

where f8 denotes a focal length of the eighth lens; and d15 denotes an on-axis thickness of the eighth lens.

11. The camera optical lens according to claim 1, wherein the camera optical lens further satisfies the following conditions:

$$f/IH \geq 2.00,$$

where IH denotes an image height of the camera optical lens.

* * * * *